(No Model.)

J. N. KENDALL.
MACHINE FOR SKIVING AND SCORING LEATHER.

No. 531,949. Patented Jan. 1, 1895.

UNITED STATES PATENT OFFICE.

JAMES N. KENDALL, OF NASHUA, NEW HAMPSHIRE.

MACHINE FOR SKIVING AND SCORING LEATHER.

SPECIFICATION forming part of Letters Patent No. 531,949, dated January 1, 1895.

Application filed April 7, 1894. Serial No. 506,751. (No model.)

*To all whom it may concern:*

Be it known that I, JAMES N. KENDALL, a citizen of the United States, residing at Nashua, in the county of Hillsborough and State of New Hampshire, have invented certain new and useful Improvements in Machines for Skiving and Scoring Leather; and I do hereby declare the following to be a full, clear, and exact description of the invention, such as will enable others skilled in the art to which it appertains to make and use the same.

My invention relates to improvements in machines for scoring and skiving leather; and it consists in the combination of a revolving drum provided with longitudinal grooves for carrying the strips to be scored or skived, and annular grooves, of scoring knives adapted to work in said annular grooves as the drum is revolved, and skiving knives placed at the ends of said drum.

It also consists in the combination of a revolving drum having longitudinal grooves to receive the strips to be scored and skived and annular grooves to permit stationary knives mounted in proximity to said drum to score said strips, yielding devices for holding the strips in said grooves and a clearer for removing the strips from the grooves.

The invention will be more fully understood by the following description and accompanying drawings, in which latter—

Figure 1:
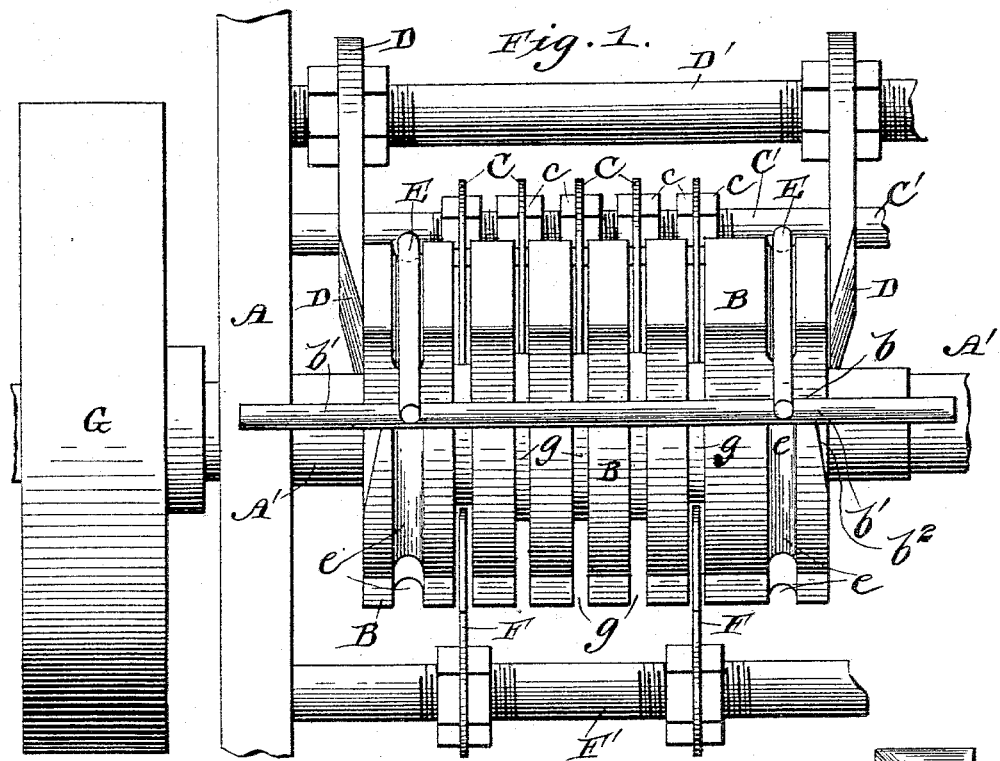
Figure 2:
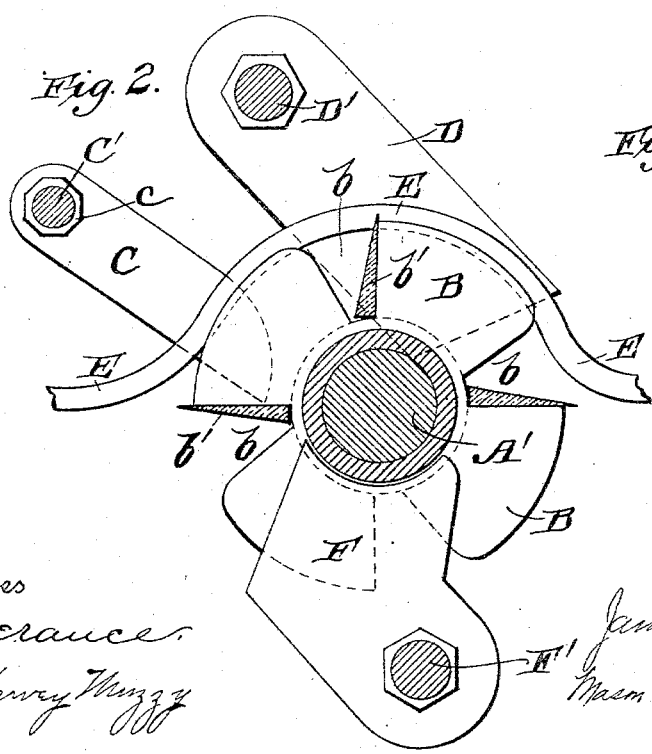
Figure 3:
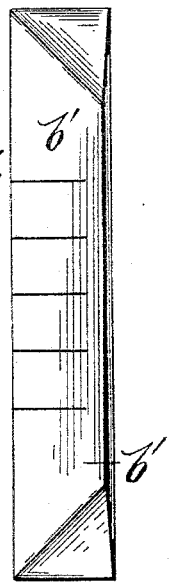

Figure 1, represents a side elevation of the devices embodying my invention. Fig. 2, represents an end elevation of the grooved drum, scoring and skiving knives and the clearer for removing the strips from the drum after they are scored and skived, and Fig. 3, is a top plan view of the product of the machine.

A in the drawings represents the main frame and A' the operating shaft of the machine; B, a grooved drum for carrying the strips of leather to be cut; C, scoring knives; D, skiving knives; E, elastic bands or straps for holding the strips in the grooves of said drum when they are being cut; F, clearers for removing said strips from the drum after being cut; G, fly and belt wheel mounted on the shaft A' and operating the same.

Upon the shaft A' is rigidly mounted the strip carrying drum B which has deep longitudinal grooves $b$ which receive the tapered or wedge shaped strips of leather $b'$ which are to be scored and skived. The strips are prevented from falling out of said grooves as the drum revolves by elastic bands or belts E which pass over the top of said drum in annular grooves $e$, at each end thereof, and have their ends attached to the frame A. This is best shown in Fig. 2 of the drawings. Just above this drum and running parallel with it is a bar C' which is screw threaded and has the scoring knives C fixed thereto by jam nuts $c$. Annular grooves $g$ are also cut in said drum in number sufficient to correspond to the number of scoring knives employed; said knives when in position fitting down into said grooves. Both of the end grooves $g$ are cut deeper than the rest of these grooves and the grooves $b$, so that the clearers F can pass beneath the strips in said latter grooves and thus remove them from said grooves. The clearers F are mounted on a screw threaded rod F' which in turn is mounted in the frame and parallel to and below said drum. The said clearers have concave ends so that they fit snugly about a portion of the bottom of the grooves within which they work.

A screw threaded rod D' is mounted above the drum and is provided with skiving knives D which bear against the respective ends of the drum. At each end of each of the longitudinal grooves $b$, an inclined skiving recess $b''$ is cut in the ends of the drum.

The operation of the machine is as follows: The strips of leather are fed into the grooves $b$ by hand as the drum B slowly revolves. The elastic bands E engage the strips and hold them firmly in said grooves, and as the drum continues its revolution the ends of the strips successively strike the skiving knives and are pushed back into the recesses $b''$ but the whole end of the strip is not allowed to pass beneath the skiving knife because of the inclined shape of said recesses, and thus the projecting ends of said strips are tapered off, which gives them the desired shape. As the drum continues its revolution the strips come in contact with the scoring knives C and are thus slit or cut transversely, but not fully across their width. The continued revolution will bring the strips in contact with the clearers and thus remove them from the grooves *b*.

All of the knives and the clearers are so mounted on their respective supporting rods that they can be conveniently removed or adjusted.

What I claim as my invention is—

1. In a leather scoring and skiving machine the combination with the frame, of a shaft carrying a revolving drum which is provided with longitudinal strip receiving grooves and annular grooves, scoring knives adapted to work in said annular grooves, and skiving knives placed at the ends of said drum, substantially as described.

2. In a leather scoring and skiving machine the combination of the frame, a shaft mounted in the same, a drum mounted on said shaft and provided with longitudinal strip receiving grooves, annular grooves, and skiving recesses, scoring knives adapted to work in said annular grooves and skiving knives placed at the ends of the drum and adapted to pass the leather being cut into said skiving recesses and thereby cut a tapering slice therefrom, substantially as described.

3. In a leather scoring and skiving machine the combination of the frame, a shaft carrying a drum which is provided with longitudinal strip holding grooves and annular grooves, scoring knives adapted to work in said annular grooves, skiving knives placed at the ends of said drum, means for holding the leather in said longitudinal grooves while it is being scored or skived, and clearers for removing the leather after it has been scored or skived, substantially as described.

4. In a leather scoring or skiving machine the combination of the frame, a shaft mounted in the same, a drum mounted on said shaft and provided with longitudinal strip receiving grooves and annular grooves and skiving recesses, scoring knives adapted to work in said annular recesses, skiving knives placed at the ends of said drum and adapted to press the leather being cut into said skiving recesses and thereby cut a tapering slice therefrom, means for holding the leather in the said longitudinal grooves while it is being scored and skived, and clearers for removing the leather after it has been scored and skived, substantially as described.

5. In a leather scoring and skiving machine the combination with the frame, of a shaft carrying a revolving drum which is provided with longitudinal strip receiving grooves and annular grooves, scoring knives adapted to work in said annular grooves, and skiving knives placed at the ends of said drum and capable of adjustment in relation to the same, substantially as described.

In testimony whereof I hereunto affix my signature in presence of two witnesses.

JAMES N. KENDALL.

Witnesses:
R. T. SMITH,
S. J. M. SMITH.